United States Patent [19]

Park et al.

[11] 4,347,464

[45] Aug. 31, 1982

[54] FET MOTOR DRIVE SYSTEM

[75] Inventors: John N. Park, Rexford; Robert L. Steigerwald, Scotia, both of N.Y.

[73] Assignee: General Electric Company, Schenectady, N.Y.

[21] Appl. No.: 239,724

[22] Filed: Mar. 2, 1981

[51] Int. Cl.³ .............................................. H02K 24/02
[52] U.S. Cl. ..................................... 318/254; 318/138; 318/439
[58] Field of Search .................... 318/254, 254 A, 138, 318/439

[56] References Cited

U.S. PATENT DOCUMENTS

| | | | |
|---|---|---|---|
| 3,153,185 | 10/1964 | Hummel | 318/254 |
| 3,440,506 | 4/1969 | Krestel et al. | 318/254 A |
| 3,495,148 | 2/1970 | Marchal et al. | 318/254 |
| 3,895,273 | 7/1975 | Parker | 318/254 |

Primary Examiner—J. V. Truhe
Assistant Examiner—S. M. Bergmann
Attorney, Agent, or Firm—William H. Steinberg; James C. Davis, Jr.; Marvin Snyder

[57] ABSTRACT

A multipole permanent magnet rotor is positioned on a shaft and rotatably mounted in a multiphase stator having two windings per stator phase. A distributor comprising a pattern of conducting and non-conducting material is mounted to turn with the rotor shaft. Pickup "fingers" in contact with the distributor, gate appropriate FET's of the pairs of FET's associated with each stator phase in sequence, with timing dependent on the instantaneous shaft position, to generate a rotating flux field. A voltage across the windings provides the current for flux generation, and can be supplied by a full wave rectified single phase AC source. The speed of rotation of the motor can be controlled by varying the voltage supplied.

4 Claims, 2 Drawing Figures

FET MOTOR DRIVE SYSTEM

This invention relates to a motor drive system for a multiphase synchronous motor using a shaft position sensor.

A desirable motor drive system should be simple low in manufacturing cost and have electromechanical characteristics such as good starting and running torque, high efficiency, good line power factor and ease of speed control, the latter being difficult to obtain in simple low cost systems.

Existing AC motor drives that are not speed controlled operate either synchronously or with slip. Those AC motors that do have speed control employ additional and sometimes complex and costly SCR's, triacs or bipolar transistor speed control systems. Universal motors have severe limitations imposed by commutator problems such as arcing and frequent maintenance requirements.

It is an object of the present invention to provide an AC motor drive system that combines the advantages of the mechanical simplicity of induction motor construction and the electromechanical characteristics of good torque vs. speed curve and ease of controlling speed of a DC separately excited motor.

SUMMARY OF THE INVENTION

In one embodiment, a synchronous motor having a multipole permanent magnet rotor is positioned on a shaft and rotatably mounted in a multiphase stator having two windings per stator phase. Distributor means comprising a pattern of conducting and non-conducting material is mounted in turn with the rotor shaft. Pickup means in contact with the distributor means gate appropriate FET's of the pairs of FET's associated with each stator phase in sequence, with timing dependent on the instantaneous shaft position, to generate a rotating flux field. A voltage across the windings provides the current for flux generation and can be supplied by a full wave rectified single phase AC source. The speed of rotation of the motor can be controlled by varying the voltage supplied.

BRIEF DESCRIPTION OF THE DRAWING

While the specification concludes with claims particularly pointing out and distinctly claiming the present invention, the objects and advantages can be more readily ascertained from the following description of a preferred embodiment when read in conjunction with the accompanying drawing in which:

Referring now to FIG. 1, a synchronous motor having an eight pole rotor 3, which in this embodiment is a permanent magnet rotor (of which ¼ is shown), is mounted on a shaft 5 and positioned for rotation in a stator having 2 windings per stator phase. One pair of windings 7 and 9 are associated with one stator phase while the other pair of windings 11 and 13 are associated with the other stator phase. Windings 7 and 9 are bifilar wound as are windings 11 and 13 to minimize leakage flux. A field effect transistor (FET) is provided for each winding. In this embodiment, the FET's are n channel power MOSFETs. The power MOSFETs inherently have built into them on integral reverse diode connected across the drain and source. The drain of FET $Q_1$ is connected to one end of winding 7. The drain of an FET $Q_3$ is connected to one end of winding 9. Connected between the drains of FET's $Q_1$ and $Q_3$ is a snubber capacitor 19. The integral diode 21 of FET $Q_1$ serves as a coasting diode to handle reverse current and similarly integral diode 23 of FET $Q_3$ also serves as a coasting diode. A resistor 25 is connected between the gate and source of FET $Q_1$ and a resistor 27 is connected between the gate and source of FET $Q_3$ to remove the charge of the gate to source capacitance. The sources of FET $Q_1$ and $Q_3$ are both connected to ground.

Figures 1, 2:
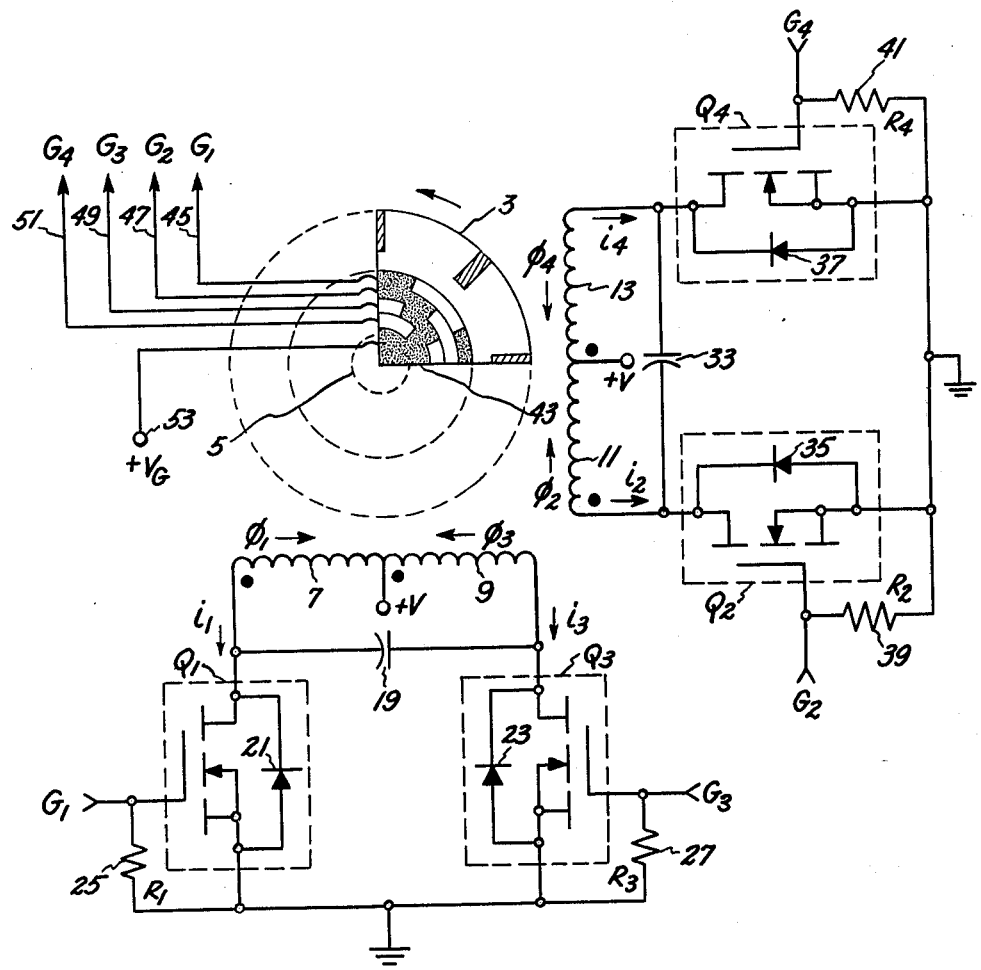
FIG. 1 shows a schematic representation of one embodiment of the FET motor drive system of the present invention.
FIG. 2 shows a table giving the gating sequence used in the FET motor drive system of FIG. 1.

One end of winding 11 is connected to FET $Q_2$ while one end of winding 13 is connected to FET $Q_4$. Connection between the drains of FET's $Q_2$ and $Q_4$ is a snubber capacitor 33. Integral diode 29 of FET $Q_2$ serves as a coasting diode to handle reverse current and similarly integral diode 37 of FET $Q_4$ also serves as a coasting diode. A resistor 39 is connected between the gate and source of FET $Q_2$ and a resistor 41 is connected between the gate and source of FET $Q_4$ to remove the charge of gate to source capacitance. The sources of FET $Q_2$ and $Q_4$ are both connected to ground. An external DC voltage source (not shown) which may be a full wave rectifier connected to an AC supply, is connected to the other end of windings 7, 9, 11 and 13.

The relative polarities of windings 7, 9, 11 and 13 are shown by dots according to the convention that the end of winding 7 connected to the drain of FET $Q_1$ and the end of winding 9 connected to the external DC source have the same polarity. The end of winding 11 connected to the drain of FET $Q_2$ and the end of winding 13 connected to the external DC source also have the same polarity.

A distributor 43 (¼ of which is shown) consists of a disc of conducting material arranged in a pattern that rotates with the rotor shaft. The disc may be a printed circuit board with an etched copper foil pattern. Pick up means 45, 47, 49, 51 and 53 which are shown in the Figure as metal "fingers" riding on the distributor. Pick ups 45, 47, 49 and 51 are connected to FET's $Q_1$, $Q_2$, $Q_3$ and $Q_4$, respectively. Pick up 53 is connected to an external gate voltage source not shown.

The operation of the motor drive system will now be explained with reference to FIGS. 1 and 2. The shaft 5 instantaneous position determines which FET's will be gated. When an FET is gated the associated winding provides a component of the total flux. The windings associated with a stator phase generate fluxes in opposite directions relative to one another when their respective FET is energized. The pattern of conducting and non-conducting materials on the distributor 43 results in the gate sequencing shown in FIG. 2. Also shown in FIG. 2 is the resultant flux for each rotor position. A 22½° turn of the eight pole rotor is equivalent to 90° of flux rotation. The distribution pattern repeats itself every 90° of shaft rotation.

The relative position of the distributor and the pick up means shown in FIG. 1 results in $Q_1$ being gated on and $Q_2$ just being gated on. The combination of flux from winding 7 and winding 11 result in a flux in the direction shown in the table of FIG. 2 for time 1. As the shaft rotates a rotating stator flux is produced. The motor is self-starting. The very high gate input impedance of the FET's results in almost negligible gate current to accomplish FET switching and therefore minimal contact wear. No electronic components are needed between the gate voltage supplied to the distributor and the gates of the switching devices. The FET motor drive system is amenable to electronic speed control by, for example, chopping a full wave rectified single phase AC source to control the voltage supplied.

It is understood that the foregoing detailed description is given merely by way of illustration and many modifications can be made therein without departing from the spirit or scope of the present invention.

What is claimed is:

1. A synchronous motor drive system comprising:
   a multiphase stator having two windings per stator phase;
   a shaft;
   a multipole rotor affixed to said shaft, said shaft mounted for rotation in said stator;
   switch means for controlling the current to each of said windings, said switch means including a field effect transistor for each winding, each said field effect transistor having a gate, a source and a drain, the drain of each field effect transistor being connected to one end of a corresponding winding, the source of each field effect transistor being connected to ground, the other end of each of said windings adapted to be connected to an external DC source, said windings being connected so that current flowing in one winding of a stator phase results in flux in the opposite direction from the flux resulting from current flowing in the other winding of the same stator phase;
   distribution means having a pattern of conductive and non-conductive material mounted to turn with said shaft for determining the sequence said field effect transistors are energized; and
   pick up means in contact with said distributor means for coupling an external source of gate voltage to said distributor means and for selectively coupling gate voltage to the gates of said field effect transistors dependent on the pattern of said distribution means and the shaft instantaneous position.

2. The synchronous motor drive system of claim 1 wherein said multipole rotor is a permanent magnet multipole rotor.

3. The synchronous motor drive system of claim 1 wherein said two windings per stator phase are bifilar wound.

4. The synchronous motor drive system of claim 1 wherein said field effect transistors are power MOSFET field effect transistors.

* * * * *